United States Patent [19]
Austin et al.

[11] 3,709,339
[45] Jan. 9, 1973

[54] BAND CLUTCH ASSEMBLY

[75] Inventors: Max M. Austin, Mishawaka; Norman B. Boulton, South Bend, both of Ind.

[73] Assignee: National-Standard Company, Niles, Mich.

[22] Filed: July 29, 1971

[21] Appl. No.: 167,327

[52] U.S. Cl. ............................. 192/41 S, 192/81 C
[51] Int. Cl. ........................................... F16d 41/20
[58] Field of Search ............... 192/41 S, 81 R, 81 C

[56] References Cited

UNITED STATES PATENTS 3,483,955  12/1969  Schell et al. .................... 192/41 S

*Primary Examiner*—Allen D. Herrmann
*Attorney*—John A. Dienner et al.

[57] ABSTRACT

An overrunning clutch comprising drive and driven clutch members, one of which has a V-groove into which the narrow tapered ends of a plurality of interfitting and overlapping clutch bands are disposed. An anchor is provided on the wide ends of the clutch bands which are disposed in slots formed in the other of such clutch members, where the slots are substantially longer than the anchors in a circumferential direction. The slots and anchor are conformably shaped so that as the load is applied the anchor is moving from one end of the slot to the other causes the bands to tighten into a snug pack just as the driving face of the anchor strikes the driving surface of the slot to thereby minimize deflections in the bands as well as radial forces in the drive member.

9 Claims, 5 Drawing Figures

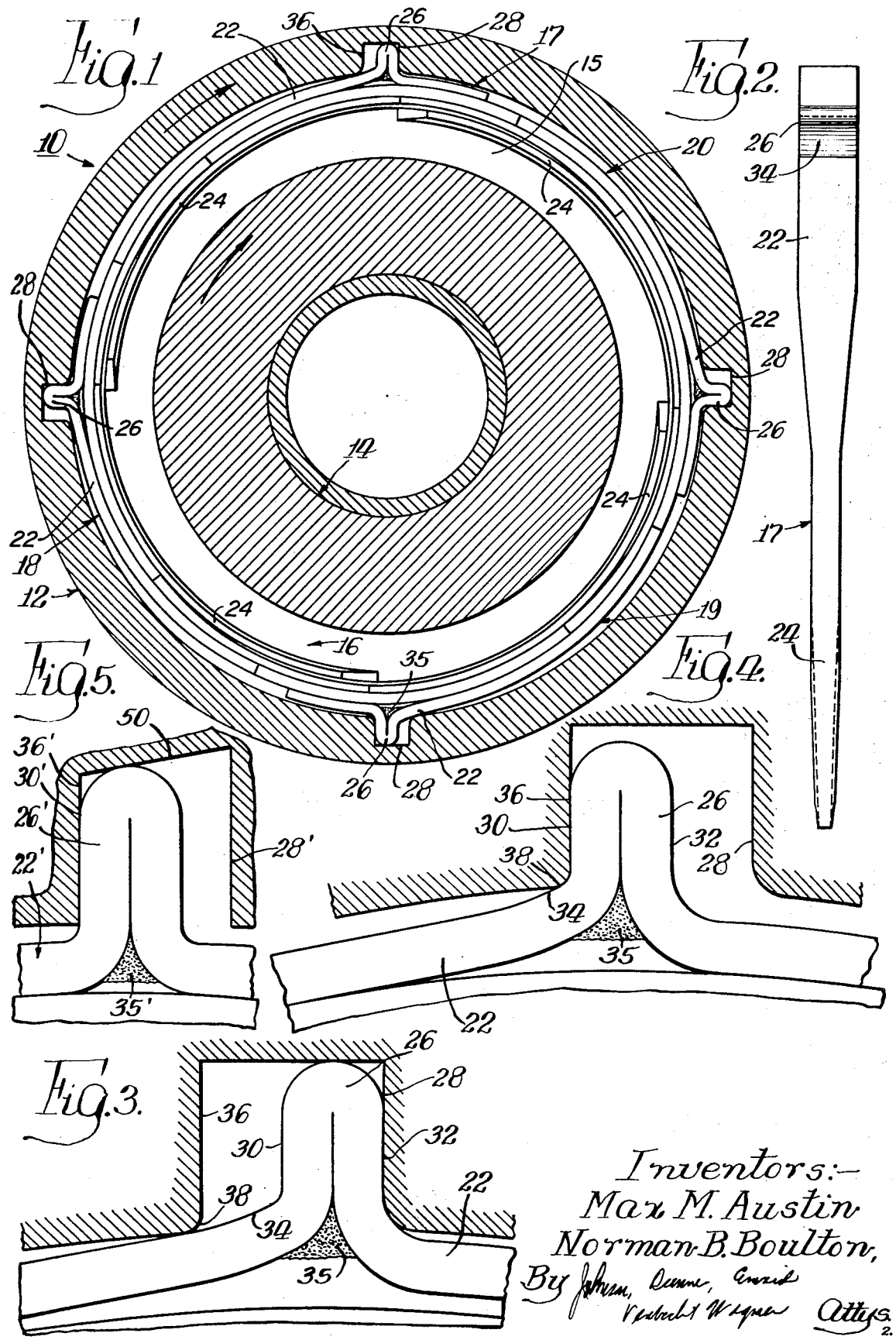

BAND CLUTCH ASSEMBLY

BACKGROUND OF THE INVENTION

The present invention relates to clutch bands for band clutches of the overrunning type.

The clutch band of this invention relates to the class of band clutch constructions disclosed in U.S. Pat. No. 2,518,453, issued Aug. 15, 1950 to J. M. Dodwell. This patent discloses a band-type, free-wheeling clutch embodying drive and driven clutch members, one of which is provided with a V-groove onto which the narrow tapered ends of a plurality of interfitting and overlapping clutch bands are disposed. The wide ends of such clutch bands are anchored to the other of such clutch members so that upon rotation of the drive member in one direction a driven member is driven in the same direction through the engagement of the side edges of the narrow tapered ends of each clutch band with the side walls of the V-groove.

In operation of the overrunning or free-wheeling type clutches, upon rotation of the drive clutch member so as to tighten the clutch bands around the V-groove, the overlying portions of the clutch bands are drawn tightly against the underlying portions of adjacent clutch bands and the side edges of the clutch bands are urged into frictional driving engagement with the side walls of the V-groove.

When the drive member of the above type of clutch is made of material other than metal, such as thermosetting plastic, it is desirable to limit the forces to a tangential direction. Previous design efforts to achieve a snug pack before a large load is applied, for example, U.S. Pat. No. 2,895,577 to J. M. Dodwell, are unsatisfactory because of the inherent bursting forces. The object of this invention is to apply a truly tangential load at the anchor and provide a snug pack to minimize deflections in the bands for increasing the useful life of the clutch.

SUMMARY OF THE INVENTION

In a preferred embodiment of the invention, a plurality of torque transmitting bands are disposed in overlapping and interfitting relation between a drive member and a driven member. Each band has an anchor formed on its wider end which conformably fits into slots provided in the peripheral surface of the driven member. Each slot has a circumferential length greater than the thickness of the anchor. A ramp surface is provided so that when a load is applied the anchor moves across the slot in such a fashion that the bands are brought into a tight or compact pack before the anchors strike the end walls of the slots.

BRIEF DESCRIPTION OF DRAWING

For a better understanding of the present invention reference may be had to the accompanying drawing in which:

FIG. 1 is a vertical sectional view of an overrunning type clutch constructed in accordance with the principles of the present invention;

FIG. 2 is a top plan view of one of the clutch bands depicted in FIG. 1;

FIG. 3 is an enlarged view of FIG. 1 showing the anchor portion of one of the clutch bands in overrun condition;

FIG. 4 is an enlarged view of FIG. 1 showing the anchor portion of one of the clutch bands in driving condition; and FIG. 5 is an enlarged view of the anchor portion of an overrunning type clutch illustrating another embodiment constructed in accordance with the principles of this invention.

DESCRIPTION OF ONE EMBODIMENT

In FIG. 1, there is shown an overrunning band clutch 10 having a drive and driven clutch members 12 and 14, respectively, and a clutch band assembly generally designated by the reference numeral 16. As is conventional in clutches of this type, the driven clutch member 14 is formed with a circumferentially extending V-groove 15 defined by a pair of opposed sidewalls tapering inwardly towards each other and terminating into a bottom wall. A typical driven clutch member having a V-groove is depicted and described in U.S. Pat. No. 3,275,111, which issued to E. U. Lang et al. The driven clutch member 14 is generally made of hardened steel or a similar material capable of withstanding the wedging action of the clutch band assembly 16.

The clutch band assembly comprises four identical clutch bands 17 through 20 of generally spiral configuration which are positioned to be disposed in an interfitting and overlapping arrangement. Each of the clutch bands are integrally formed as a one-piece structure preferably made of spring steel stock.

The clutch band 17 is illustrated by way of example in FIG. 2, and includes a wider or outer end portion 22 and a narrower or inner end portion or tip 24. An anchor 26 is provided at the end of wider end portion 22 and fits into one of the four identical slots 28 formed in the drive member of FIG. 1. The anchor 26 is formed by folding a short segment of the wider end portion 22 upon itself into an arcuate configuration and brazing at 35 their common side together to define a driving face 30 and a release face 32. Slots 28 are formed as U-shaped cutouts in the inner surface of the drive member 12. The length of the slots 28 in a circumferential direction is substantially greater than the thickness of the anchors 26 to permit "breathing" of the clutch bands. By "breathing" is meant the radial loosening of the band assembly 16 to provide low overrun torque. It will be noted that the driving face of the anchors 26 of the clutch bands is disposed along a generally radial line of the overrunning band clutch 10.

One of the important and critical features to the design of the FIG. 1 embodiment is the provision of an inclined ramp surface 34 formed on the outer surface of the clutch band 18 at the base of anchor 26 between its driving face surface 30 and the wider end portion or outer end portion 22. Ramp surface 34 is inclined at an oblique angle to a tangent to the inner radius of drive member 12 so that clutch band assembly 16 is tightened before the driving face 30 of each clutch band engages the driving sidewall of slots 28. By virtue of this arrangement, the force applied to the face 36 of the drive member is tangential and the bursting forces are substantially reduced.

In operation of the embodiment of FIG. 1, when the drive member 12 begins to rotate in the direction indicated by the arrow, the clutch bands 17–20 tighten around the V-groove of the driven member 14. As the bands contract in a radial inward direction, the anchors move relatively counterclockwise (as viewed in FIG. 1) towards the driving wall 36 of slots 28. During this movement, ramp surface 34 rides against inner corner 38 of slots 28 to guide anchor 32 outwardly of slots 28 and the outer end portion 22 into engagement with a band immediately below the anchor. By virtue of the guiding function performed by ramp surface 34 on each band, the clutch assembly 16 is tightened before the load is applied to the driving face 30 of each anchor 26.

In those instances where the drive member 12 is made from a softer material, such as aluminum, the formation of the ramp surfaces 34 on the bands does not have to be as precise because the spring steel bands will displace corner 38 of each slot 28 until the proper bearing surface is provided to guide the anchors 26 during tightening of the pack.

Referring to FIG. 5, there is shown an alternate means of guiding the anchors of clutch band assembly 16 during their clutching operation. Like parts to FIGS. 1 through 4 are designated by prime numbers. In this embodiment, the slot 28' for each clutch band is provided with a ramp surface 50 formed as their rear wall. Ramp surface 50 of FIG. 5 performs the identical function as the ramp surface 34 in FIGS. 3 and 4. As the band assembly tightens and the anchors 26' move counterclockwise, the top of each anchor 26' rides along ramp 50 (to the left as viewed in FIG. 5) forcing the anchor to move outwardly of slot 28' and the outer end portion 22' to engage the band below the anchor. This action occurs prior to driving face 30' of anchor 26' engaging driving surface 36' of slot 28' to greatly reduce the force exerted on driving face 30' as compared to earlier designs. It is noted again that the force exerted on driving face 30' of each anchor has substantially no radial component.

It will thus be seen that we have provided a novel and substantially improved clutch construction. By providing ramp surface for guiding each anchor out of the slots during tightening of the band assembly and by making the slots sufficiently wide in the circumferential direction, the anchor moves from one end of the slot to the other causing the bands to contract into a snug pack just as the driving surface of the anchor strikes the driving surface of the slot to thereby minimize deflections in the bands as well as radial forces in the drive member.

We claim:

1. In combination in an overrunning clutch having a drive clutch member and a driven clutch member coaxially disposed with respect to the drive clutch member, one of said clutch members being provided with a circumferentially extending V-groove in the peripheral surface facing the other clutch member, the other of said clutch members being provided with an axially extending slot in its peripheral surface facing said V-groove, and a torque transmitting band comprising an outer end portion, an inner end portion and an anchor formed at the end of said outer end portion, said inner end portion extending into said V-groove and said anchor contained within said slot, whereby relative rotation of said members in one direction will cause said band to contract to transmit torque between said members, the improvement comprising the length of said slot in a circumferential direction being substantially greater than the thickness of said anchor, both end walls of said slot and the driving and releasing faces of said anchor extend in a generally radial direction, and one of said slot and anchor having a ramp surface inclined at an oblique angle to a tangent to the inner radius of said other clutch member to guide said anchor along said oblique angle during the tightening of said band such that said driving face of said anchor engages the driving end wall of said slot just as the band is fully tightened.

2. In a combination as defined in claim 1, wherein said ramp surface is formed on said band at the base of said driving face of said anchor and is contiguous with said driving face.

3. In a combination as defined in claim 2, wherein said band is made of hardened steel stock and said other clutch member is made of a softer material.

4. In a combination as defined in claim 1, wherein said anchor comprises a fold formed at the end of said outer end portion, the outer opposite surfaces of said fold defining said driving and release faces, where said driving face extends generally along a radial line.

5. In a combination as defined in claim 1, wherein said ramp surface is formed by the rear wall of said slot that interconnects said end walls.

6. In combination in an overrunning clutch having a drive clutch member and a driven clutch member coaxially disposed with respect to the drive clutch member, one of said clutch members being provided with a circumferentially extending V-groove in the peripheral surface facing the other clutch member, the other of said clutch members being provided with a plurality of spaced axially extending slots in its peripheral surface facing said V-groove, and a plurality of torque transmitting bands, each of said bands comprising outer end portion and inner end portion with an anchor formed at the end of said outer end portion, said inner end portion extending into said V-groove and said anchor contained within said slot, whereby relative rotation of said members in one direction will cause said bands to tighten, the improvement comprising the length of each of said slots in a circumferential direction being substantially greater than the thickness of said anchor, both end walls of said slot and the driving and releasing faces of said anchor extend in a generally radial direction, and one of said slot and anchor having ramp surface inclined at an oblique angle to a tangent to the inner radius of said other clutch member to guide said anchor along said oblique angle during the tightening of said bands such that said driving face of said anchor engages the driving end wall of said slot just as the bands are fully tightened.

7. In a combination as defined in claim 6, wherein said ramp surface is formed on each of said bands at the base of said driving face of said anchor and is contiguous with said driving face.

8. In a combination as defined in claim 6, wherein said anchor for each band comprises a fold formed at the end of said outer end portion, the outer opposite surfaces of said fold defining said driving and release faces, where said driving face extends along a generally radial line.

9. In a combination as defined in claim 6, wherein said ramp surface is formed by the rear wall of said slot that interconnects said end walls.

* * * * *